(12) United States Patent
Carboneri et al.

(10) Patent No.: US 6,627,837 B1
(45) Date of Patent: Sep. 30, 2003

(54) METHOD OF MANUFACTURING A STATOR STAGE FOR A TURBINE PUMP

(75) Inventors: Roberto Carboneri, Turin (IT); Silvio Giors, Turin (IT)

(73) Assignee: Varian S.p.A., Turin (IT)

(*) Notice: Subject to any disclaimer, the term of this patent is extended or adjusted under 35 U.S.C. 154(b) by 0 days.

(21) Appl. No.: 10/163,230

(22) Filed: Jun. 4, 2002

(51) Int. Cl.$^7$ .................................................. B23H 9/00
(52) U.S. Cl. ..................................................... 219/69.17
(58) Field of Search ........................... 219/69.17, 69.12; 205/640, 686; 29/889.2, 889.22

(56) References Cited

U.S. PATENT DOCUMENTS

| | | | |
|---|---|---|---|
| 2,633,776 A | | 4/1953 | Schenk |
| 3,644,051 A | | 2/1972 | Shapiro |
| 4,509,238 A | * | 4/1985 | Lee et al. ................. 219/69.17 |
| 4,770,574 A | | 9/1988 | Lotz |
| 4,985,992 A | * | 1/1991 | Vosgien |
| 5,188,514 A | | 2/1993 | Inserra et al. |

FOREIGN PATENT DOCUMENTS

| | | | |
|---|---|---|---|
| DE | 199 37 393 A | | 2/2001 |
| EP | 0 568 069 A2 | | 11/1993 |
| GB | 2 052 317 A | | 1/1981 |
| JP | 2-42 195 A | * | 2/1990 |
| JP | 5-318230 A | * | 12/1993 |

* cited by examiner

Primary Examiner—Geoffrey S. Evans
(74) Attorney, Agent, or Firm—Bella Fishman

(57) ABSTRACT

The method uses electrical discharge machining to form, onto a disc (8) belonging to a stator (11) of a turbine pump, radial blades (12) joined to the disc at both ends and separated by very narrow channels (13). To form the blades, a workpiece (2) is exposed to a tool (1) having a circular edge (4) whose radius corresponds with an external radius of the blades. The tool is provided along its edge with at least one tongue-shaped elongated member (5) joined at one end to the tool plate (3) and extending along said edge (4) in an inclined plane. Due to a relative combined rotation and translation motion between the tool and the workpiece, at least one channel (13) with shape, size and inclination corresponding with those of the tongue element (7) is produced in the workpiece.

13 Claims, 4 Drawing Sheets

METHOD OF MANUFACTURING A STATOR STAGE FOR A TURBINE PUMP

FIELD OF THE INVENTION

The present invention refers to turbine pumps, and more particularly it relates to a method of manufacturing a stator stage for one such pump, in particular a turbomolecular pump.

BACKGROUND OF THE INVENTION

The conventional stator stages of such pumps, even when they are equipped with radial blades, are generally manufactured by forming and milling techniques.

An application entitled "TURBINE PUMP WITH A STATOR STAGE INTEGRATED WITH A SPACER RING" filed on May 31, 2002 in the name of the Applicant, discloses a turbomolecular pump comprising at least one stator stage integrated with a spacer ring, located in correspondence of a transition chamber at intermediate pressure. Such a stage comprises a disc with a plurality of radial blades, joined at their inner ends with the central disc region, and at their outer ends with the spacer ring. The blades form a very narrow angle with the disc plane, of the order of 10°, and overlap each other so as to leave very narrow channels therebetween, of the order of about 1 mm. Those values allow maintaining a molecular gas flow, in the direction from the pump inlet to the outlet, up to about 100 mtorr, that is 13,33 Pa, (it means that the pump can tolerate this pressure in the transition chamber) without losing the compression capacity of the upper stages.

Such a stator stage, where the blades are bound at both ends, cannot be manufactured by the milling and forming techniques usually employed for manufacturing conventional stator stages, since milling cannot be used for manufacturing inter-blade separation channels of reduced thickness, whereas forming does not allow manufacturing overlapping blades.

Therefore, the object of the present invention is to provide a method of manufacturing stator stages with partly overlapping radial blades, which blades have no free ends and are separated by very narrow channels.

SUMMARY OF THE INVENTION

The present invention promotes a method based on electrical discharge machining. A similar technique is already used in the field of turbine pumps to manufacture impellers and rotors, as disclosed in U.S. Pat. No. 5,188,514 entitled "Process For Manufacturing An Impeller By Electrical Discharge Machining And Articles So Obtained" issued Feb. 23, 1993. According to the teaching of this patent, a workpiece in which an impeller is to be obtained, is submitted in an apparatus for electrical discharge machining to the action of a tool comprising at least one plate in which radial slits are formed terminating in a central hollow area. Through a relative combined rotation and translation motion of the workpiece and the tool, which form the two electrodes of the apparatus, a radial blade of the impeller is manufactured for each slit. Yet the radial blades have a free end.

The object of the present invention is achieved through a method comprising a preliminary step in which a workpiece corresponding to the stator stage to be obtained is prepared and placed in an apparatus for electrical discharge machining of which the workpiece forms an electrode, in front of an electrical discharge machining tool forming the other electrode, and a relative combined rotation and translation motion of the tool and the workpiece is generated. The method is characterised in that, to manufacture a stator stage comprising a disc with a plurality of radial blades joined to the disc at both a radially inner end and a radially outer end and separated by very narrow channels, said tool comprises at least one plate equipped with at least one tongue-shaped elongated member that is joined at one end to the tool plate and extends along a peripheral edge of said plate in a plane inclined relative to the plate itself, at such a distance from the axis of said combined rotation and translation motion that the tongue always remains within said disc, so that, thanks to said relative combined rotation and translation motion of the tool and the workpiece, at least one channel, radially limited at both ends and having shape, size and inclination corresponding with those of said tongue element, is produced in the workpiece.

The features of the invention will become more apparent from the following description of a preferred embodiment, given by way of non limiting example and shown in the accompanying drawings.

DETAILED DESCRIPTION OF THE INVENTION

Figure 1:
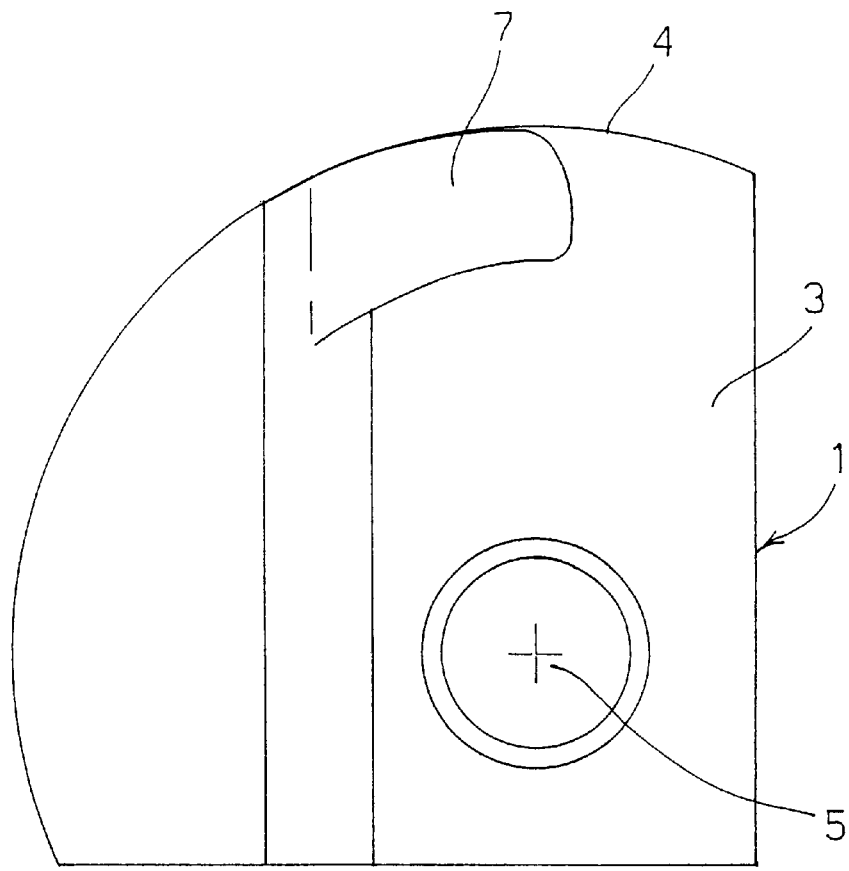
FIG. 1 is a plan view of a tool used for performing the method of the invention.
Figure 2:
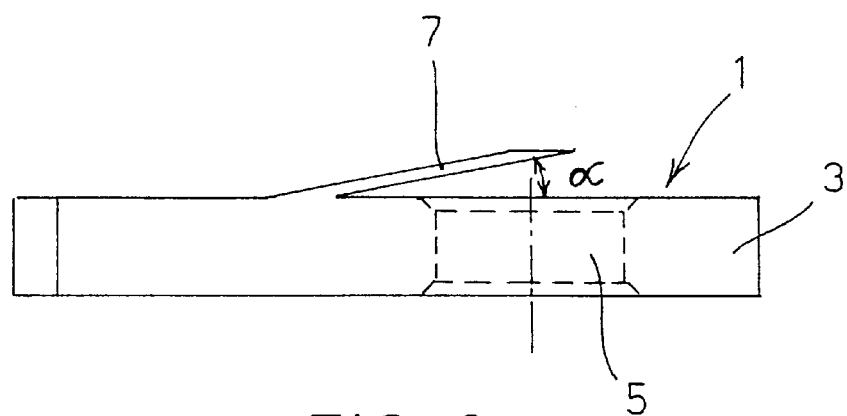
FIG. 2 is a front view of the tool shown in FIG. 1.
Figure 3:
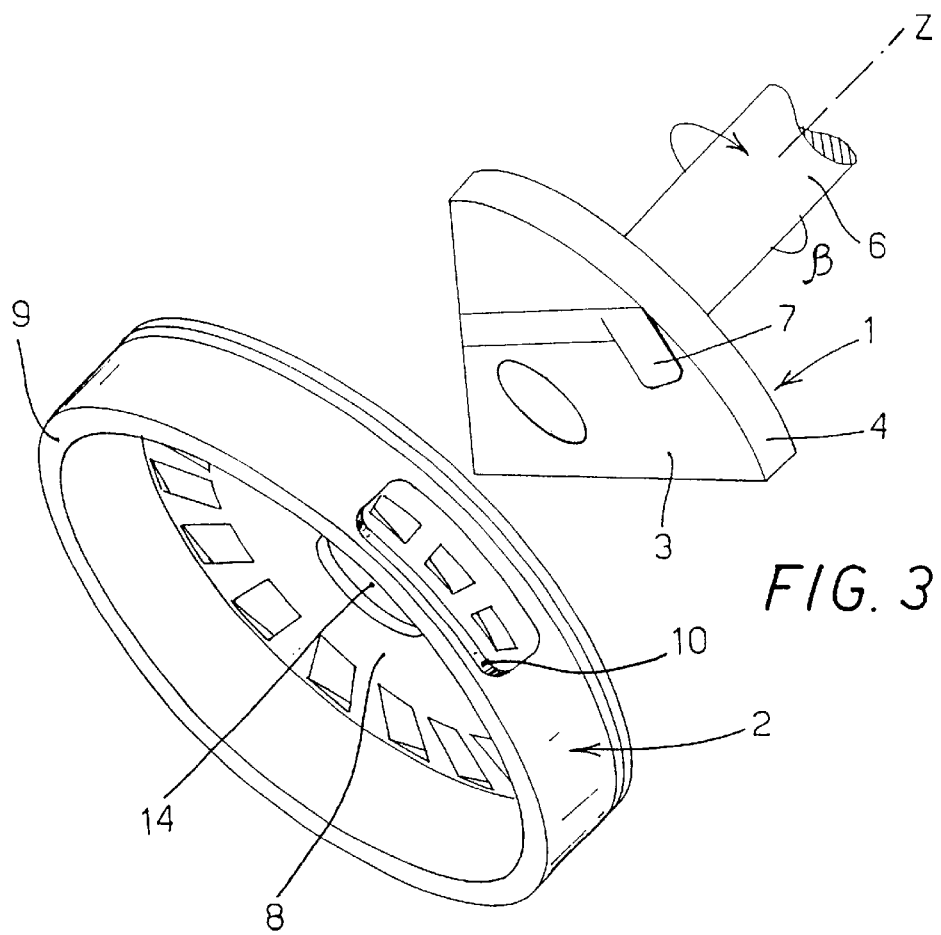
FIG. 3 is a schematic perspective view illustrating the method of the invention.

Referring to FIGS. 1 to 3, the method of the invention has been schematically shown in case of its application to the manufacture, through electrical discharge machining, of a turbine pump stator comprising a disc with radial blades and provided with a spacer ring at its outer edge. The tool is designated as 1 and the workpiece is designated as 2. Both members are located in an apparatus for electrical discharge machining, not shown since it is well known in the art and is not part of the present invention. Tool 1 forms one electrode and workpiece 2 the other electrode of that apparatus.

Tool 1, made of copper, consists of a plate 3 substantially shaped as an isosceles triangle, of which base 4 is an arc of circumference with a radius substantially corresponding to that of the stator disc to be manufactured (and, more precisely, a radius substantially equal to the distance of the outer blade edges from the disc axis). Plate 3 has a bore 5 coaxial with base 4, allowing keying tool 1 on a shaft 6, mounted onto a tool-head that can be translated along the three Cartesian axes and rotated about the Z axis.

Plate 3 has on one face a tongue 7 extending along a portion of base 4 and joined at one end with plate 3, whereas the other tongue end is free. Tongue 7 has plane surfaces and constant thickness and forms with the plane of plate 3 an angle α depending on the inclination angle desired for the blades of the stator to be manufactured.

Workpiece 2 is a substantially cup-like aluminium piece, comprising a disc 8 with a peripheral edge 9 axially projecting in both directions. The axial extension of edge 9 is different on the opposite disc edges and preferably it is greater on the side that, during working, is turned away from tool 1. An opening 10 is preformed in such a portion of greater extension and, when the stator is mounted in a pump used in a leak detector, it communicates with an intermediate pressure inlet for a test gas flowing in counter-current flow towards a gas detector connected to a low-pressure inlet of the pump.

By translating tool 1 along the Z axis and rotating it by an angle β about that axis, a combined helical rotation and translation motion is obtained by which tool 1 is made to engage the cavity defined by edge 9 and to pass through workpiece 2. The portion of disc 8 lying in front of tongue 7 is removed by electrical discharge machining, whereby an inclined channel is formed extending from edge 9 towards the centre of disc 8 to an extent substantially corresponding to the width of tongue 7. The length of tongue 7 is so chosen that the machining affects the whole thickness of disc 8.

Once a channel has been formed, tool 1 is brought again to its rest position, it is rotated by an angle corresponding to the desired angular separation between the channels and then it is again submitted to the combined helical rotation and translation motion to dig a second channel. The operations are repeated until the desired number of channel has been obtained. Machining of disc 8 will leave, between the channels, a set of blades inclined by angle α and joined with the disc not only at their radially inner edges, but also at their radially outer edges: indeed, given the radial size of plate 3 and the position of tongue 7, the peripheral edge 9 of the workpiece is not concerned by the machining.

Figure 4:
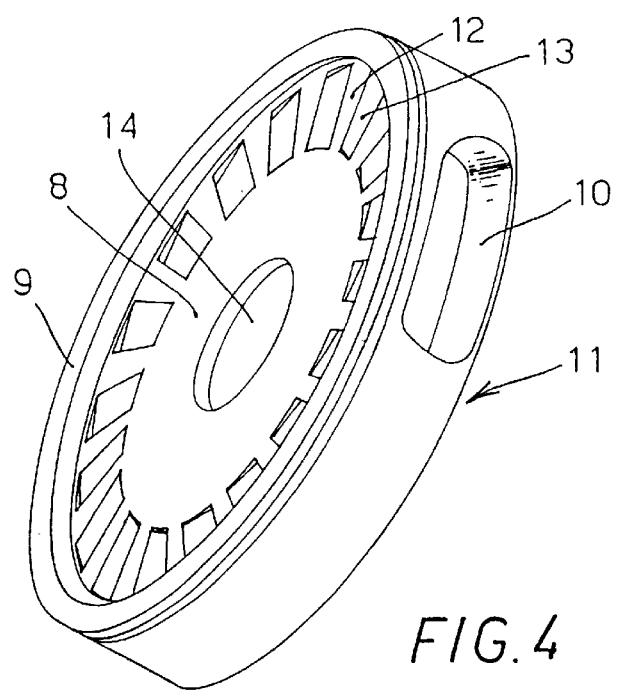
FIG. 4 is a perspective view of a stator stage manufactured according to the invention.
Figure 5:
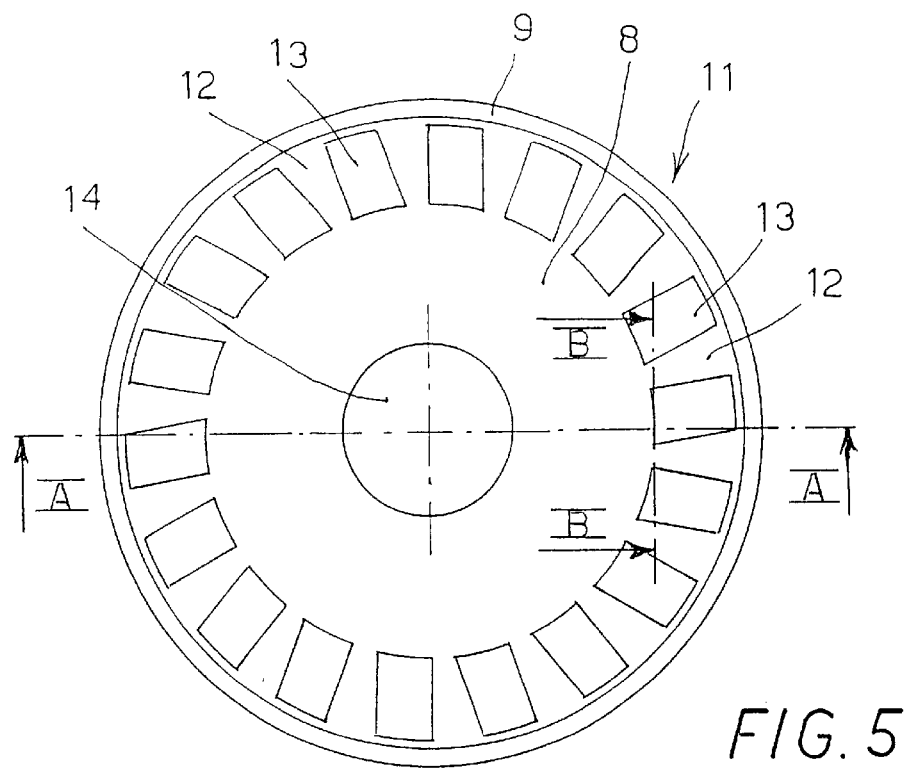
FIG. 5 is a schematic plan view of the stator shown in FIG. 4.
Figure 6:
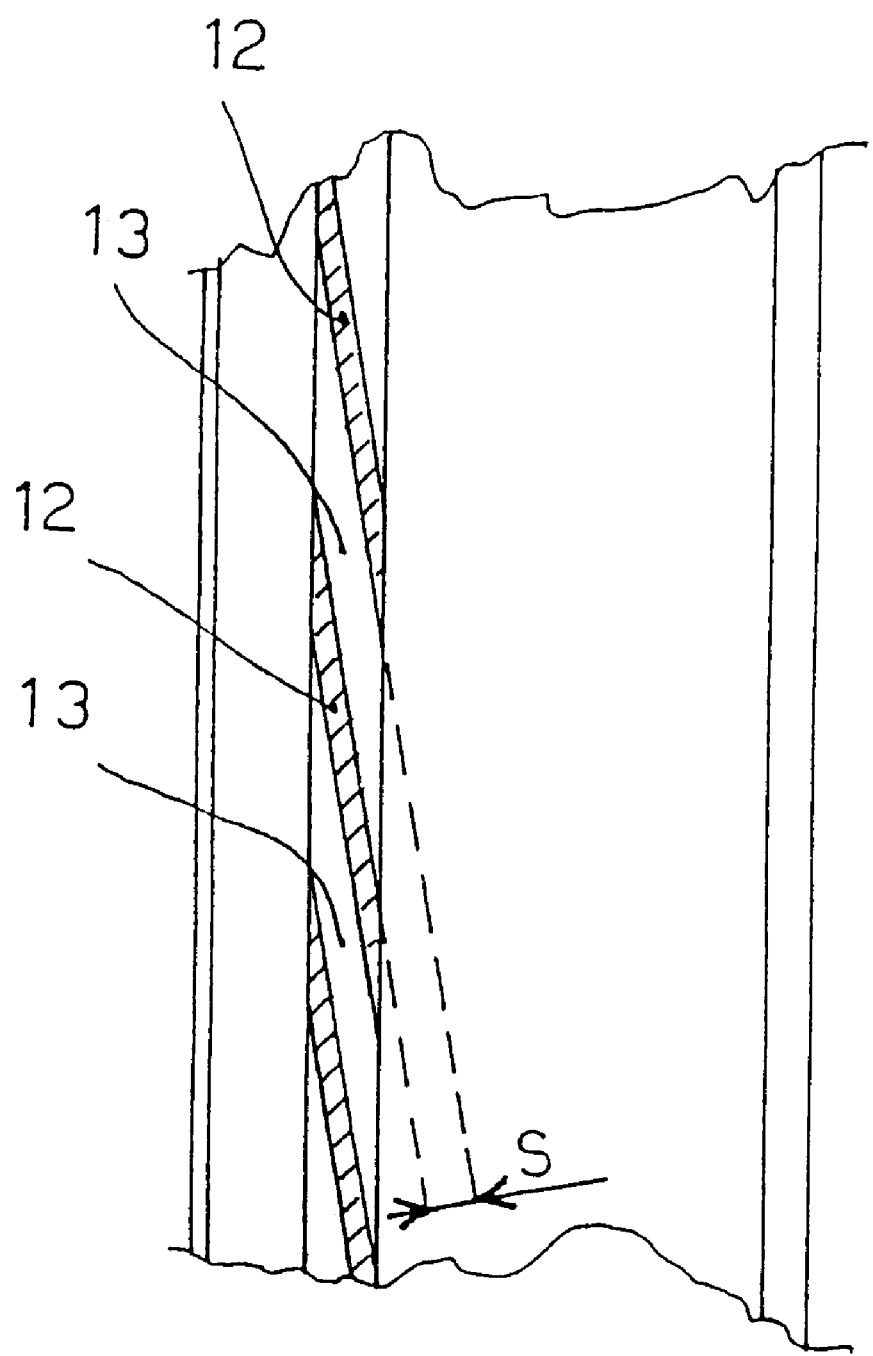
FIG. 6 is a cross-sectional view according to a plane passing through line VI—VI in FIG. 5.

FIGS. 4 to 6 show the stator 11 obtained by the method described. The blades are designated as 12, the separation channels are designated as 13 and reference numeral 14 designates a preformed central bore through which the shaft of the pump rotor passes. The cross-sectional view in FIG. 6 clearly shows the narrow angle of blades 12 relative to the plane of disc 8, corresponding with angle α, and the limited thickness s of channels 13, which is radially constant because of the constant thickness of tongue 7.

Advantageously, angle α is of the order of 10°, and thickness s is of the order of 1 mm. Such a limited thickness and the fact that blades 12 have no free ends, has led to employ electrical discharge machining to manufacture the stator.

Figure 7:
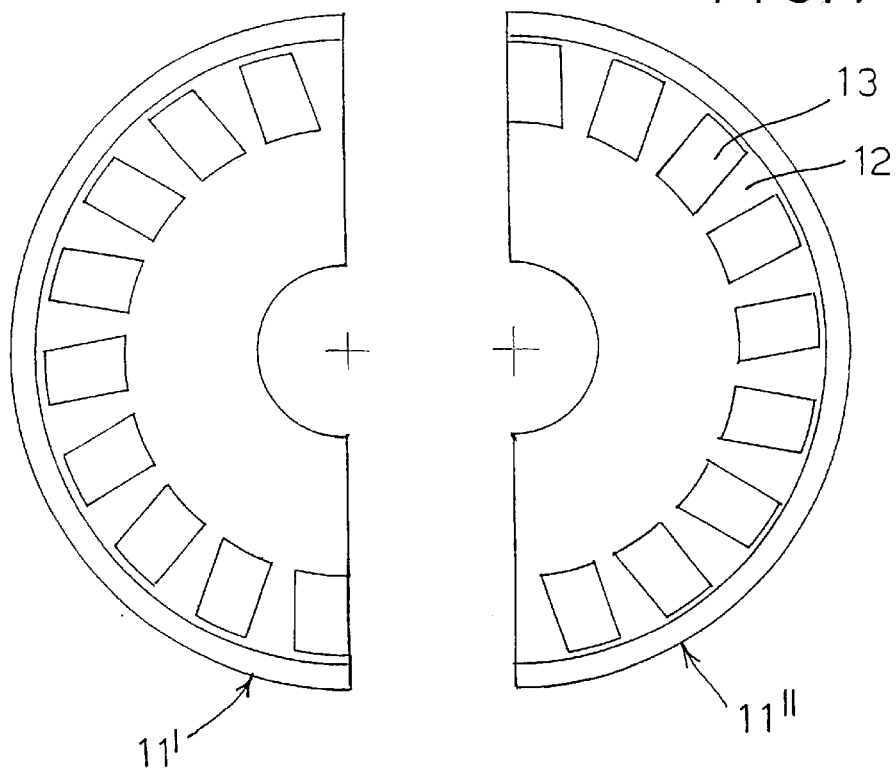
FIG. 7 is a schematic plan view of the stator ready for mounting on the rotor.

Once all blades 12 and channels 13 have been formed, the method comprises the further step of cutting stator 11 into two halves 11', 11" to allow subsequent mounting within a pump, about the rotor shaft. Also the cutting is performed by electrical discharge machining, in particular wire electrical discharge machining, by using a very thin wire (e.g. with diameter 0.1 mm) so as to ensure respecting the narrow tolerances required by the mounting in the pump. The final product is shown in FIG. 7.

It is evident that the above description is given only by way of non-limiting example and that changes and modifications are possible without departing from the scope of the invention.

In particular, obviously the method applies not only to manufacturing a stator stage integrated with a spacer ring like the stage shown in FIG. 4, but it generally allows forming, in a workpiece, channels radially limited at both ends (hence, blades joined at both ends with the body of the piece formed).

Moreover, even if a tool suitable for forming one channel at a time has been disclosed, a tool consisting of a disc having multiple tongues 7 could be envisaged, so as to allow the simultaneous manufacture of multiple, and possibly of all, channels 13. Of course, the tool could be a complete disc even in the case of a single tongue.

By using a tool having a plurality of plates or discs 3 mounted on shaft 6, all static stages of the pump could be formed, starting from a suitably shaped raw workpiece already divided into the two halves to allow placing plates 3 in front of the stator discs.

What is claimed is:

1. A method of manufacturing a stator stage for a turbine pump comprising the steps of:

providing a workpiece (2) for obtaining said stator stage (11) having a disk (8) with a plurality of radial blades (12) joined thereto radially at inner and outer ends thereof and being separated by narrow channels (13) therebetween;

providing an apparatus for electrical discharge machining having an electrical discharge machining tool (1) with at least one plate (3) equipped with at least one tongue-shaped member (7) being joined at one end with said plate (3) and extending along a peripheral edge(4) therefrom in a plane inclined relative to said plate (3), said machining tool forming a first electrode within said apparatus;

placing said workpiece (2) within said apparatus in front of said electrical discharge machining tool (1), said workpiece (2) forming a second electrode therein;

generating relative combined rotation and translation motions of said tool (1) and said workpiece (2) so as said tongue-shaped member(7) being within said disk (8) during said combined motions; and forming at least one channel (13) within said workpiece (2) radially limited at both ends and having shape, size and inclination corresponding with those of said tongue-shaped member(7).

2. The method of claim 1, further comprising a step of forming through channel (13) with said tongue-shaped member (7) having a longitudinal extension sufficient to make said through channel within said disk (8).

3. The method of claim 2, further comprising the step of generating repetitive combined rotation and translation motions of said tool (1) having a single tongue-shaped member (7) and said workpiece (2) to from a plurality of channels (13), wherein each cycle of said combined motions starts from a starting position in which said tool (1) is rotated relative to a previous starting position by an angle corresponding to the angular spacing between subsequent channels.

4. The method of claim 3, wherein said through channels are formed by a plurality of said tongue-shaped members arranged along the edge of a disk of said plate (3).

5. The method of claim 4, wherein a number of said tongue-shaped members corresponds to a requested number of said through channels.

6. The method of claim 5, wherein said channels are formed so as to separate pairs of inclined and overlapping radial blades (12).

7. The method of claim 6, wherein each said tongue-shaped member (7) is in the plane that is inclined relative to said plate (3) in the order of about 10°.

8. The method of claim 7, wherein each said channel is formed by a corresponding tongue-shaped member(7) having a constant thickness.

9. The method of claim 8, wherein each said channel is formed by said corresponding tongue-shaped member (7) so as that each said channel having a constant thickness of the order of about 1 mm in a radial direction.

10. The method of claim 6, wherein the step of generating relative combined rotation and translation motions of said tool (1) and said workpiece (2) further comprising a step of engaging said workpiece (2) and said tool (1) by protruding said tool via a hollow within said workpiece (2) defined by an axially projected circumferenciall edge (9) of disk (8).

11. The method of claim 10, further comprising a step of simultaneous forming of one or more through channels (13) in plurality of stator stages by providing said tool (1) with a plurality of said plates(3) carried by a shaft, and providing said workpiece (2) with a corresponding plurality of disks (8), wherein in operation each said plate(3) is located in front of one of said disks and being brought thereagainst via said combined rotation and translation motions.

12. The method of claim 11, wherein after the step of forming channels (13) each said disk (8) is divided into two halves along a diametrical line for mounting onto a rotor of said pump.

13. The method of claim 12, wherein the step of dividing into two halves of said disk (8) is performed by electrical discharge machining by means of a wire.

\* \* \* \* \*